(12) United States Patent
Gross et al.

(10) Patent No.: US 6,417,466 B2
(45) Date of Patent: *Jul. 9, 2002

(54) LOAD CELL WITH BOSSED SENSOR PLATE FOR AN ELECTRICAL WEIGHING SCALE

(75) Inventors: Chris Gross, Yorktown, VA (US); Damon Germanton, Kennalon, NJ (US)

(73) Assignee: Measurement Specialties, Inc., Fairfield, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/146,890

(22) Filed: Sep. 3, 1998

(51) Int. Cl.$^7$ .............................. G01G 3/14; G01L 1/04
(52) U.S. Cl. .............. 177/211; 73/862.629; 73/862.632
(58) Field of Search .................... 177/211, 229; 73/862.629, 862.632, 862.637

(56) References Cited

U.S. PATENT DOCUMENTS

| | | | | |
|---|---|---|---|---|
| 3,213,400 A | * | 10/1965 | Gieb ..................... | 73/862.629 |
| 4,166,997 A | * | 9/1979 | Kister ................... | 73/862.629 |
| 4,291,776 A | | 9/1981 | Kupper et al. ............. | 177/229 |
| 4,454,771 A | * | 6/1984 | Shimazoe et al. ....... | 73/862.632 |
| 4,548,086 A | * | 10/1985 | Kastel ........................ | 177/229 |
| 4,691,794 A | * | 9/1987 | Larsen et al. ................ | 177/211 |
| 4,744,254 A | * | 5/1988 | Barten ........................ | 177/211 |
| 4,759,416 A | * | 7/1988 | Voorhorst ................... | 177/211 |
| 4,800,973 A | * | 1/1989 | Angel ......................... | 177/211 |
| 5,024,107 A | * | 6/1991 | Bethe ......................... | 177/211 |
| 5,183,126 A | * | 2/1993 | Kellenbach .................. | 177/211 |
| 5,801,339 A | * | 9/1998 | Boult ......................... | 177/261 |
| 5,929,391 A | * | 7/1999 | Petrucelli et al. ........... | 177/211 |
| 6,005,199 A | * | 12/1999 | Harada et al. ............... | 177/211 |

FOREIGN PATENT DOCUMENTS

| EP | EP 0 670 480 A1 | 9/1995 | .......... G01G/21/23 |
|---|---|---|---|
| GB | GB 2 183 051 A | 5/1987 | ............. G01L/1/22 |

OTHER PUBLICATIONS

European Search Report dated Feb. 20, 2001; Completed at The HAGUE; pp. 1 and 2.
European Search Report dated Feb. 20, 2001; Completed at The HAGUE; pp. 1 and 2.

* cited by examiner

Primary Examiner—Randy W. Gibson
(74) Attorney, Agent, or Firm—Duane Morris LLP

(57) ABSTRACT

A sensor plate for use in a load cell for use in an electronic scale comprising a planar first surface; a planar second surface opposite the first surface having a depression formed therein defining a flexure area; a load cavity formed in the second surface having a conical receptacle end for receiving a strut; and sensors disposed over the flexure area for generating a signal in response to a load applied to the loading cavity wherein the strut has a first conical projection end coupled to the conical receptacle end of the loading cavity and a second end coupled to a footer member such that the strut mechanically floats therebetween for providing the applied load at a substantially central position at the load cavity.

20 Claims, 7 Drawing Sheets

US 6,417,466 B2

LOAD CELL WITH BOSSED SENSOR PLATE FOR AN ELECTRICAL WEIGHING SCALE

FIELD OF THE INVENTION

This invention relates generally to electronic type platform weighing systems, and more particularly to an improved load cell and sensor plate for use in an electronic weighing scale.

BACKGROUND OF THE INVENTION

There are many different types of electronic weighing scales in use today. One popular type of electronic weighing scale is constructed with a platform for receiving the load to be weighed and a set of levers, pivots, flexures, and torque tubes to mechanically combine the forces applied to the platform by the load, thereby enabling the measurement of these forces with a single electronic load cell. The load cell is typically constructed with a mechanically-deformable sensor plate which operates as a force transducer. The sensor plate has bonded thereto one or more sensor elements that serve to convert the mechanical bending forces of the sensor plate into electrical signals. When a load is applied to such a load cell, the sensor elements bonded to the sensor plate produce electrical signals which are proportional to the load applied to the load cell.

Another popular type of electronic weighing scale is constructed with a platform which is supported by several electronic load cells which each produce an output signal. The output signals of the load cells are electrically averaged to enable forces to be measured over a large area of the platform.

The sensor plates employed in the load cells described above, are of many different designs. One such load plate design is exemplified in U.S. Pat. No. 4,020,686 issued to Brendel.

The sensor plate disclosed therein is constructed with a rigid force input section, a rigid force output section, and an intermediate force moment carrying section coupled between the force input and output sections. The sections are interconnected by four horizontal flexural elements, four vertical flexural elements, a pair of force measuring members, and a pair of connecting structures. This design allows forces to be measured along a first axis of the sensor plate and also moments about a second axis of the sensor plate which is perpendicular to the first axis. However, the rather tall profile of this sensor plate design undesirably imposes minimum thickness requirements on the weighing scales.

Another load plate design can be seen in U.S. Pat. No. 4,993,506 issued to Angel. The sensor plate disclosed therein is fabricated from a single, flat metal stamping consisting of a flat flexure beam where strain sensors are bonded, a flat U-shaped loaded element attached to one end of the flexure beam, and a flat mounting element attached to the other end of the flexure beam.

Still another load plate design is described in U.S. Pat. No. 4,548,086 issued to Kastel. The sensor plate of Kastel is fabricated from an areal spring material and is provided with a force introducing section, a clamping section, and an intermediate section connected to the force introducing section and the clamping section by flexural webs which are equipped with sensor elements.

The sensor plates described in U.S. Pat. Nos. 4,993,506 and 4,548,086 are relatively thin and thus, are used in low profile scale designs which are presently very popular.

Although these sensor plate designs are relatively inexpensive to produce compared with earlier designs, further reductions in machining costs and the like are desirable.

Furthermore, prior art systems also utilize sensor plates having surfaces which have corregated or slotted rather than flat planar surfaces. This causes significant problems in attachment of electronic wires and/or electronic devices to the plate. Still further, numerous problems exist in the prior art regarding off-axis application of a load to the sensor plate. Such misalignment causes calibration and/or weight calculation errors, thus minimizing the accuracy of the scale.

Accordingly, there remains a need for an improved sensor plate and a load cell for use in electronic weighing scales which is reliable, accurate, and substantially simple and economical to manufacture.

SUMMARY OF THE INVENTION

It is an object of the present invention to provide a sensor plate for use in a load cell for use in an electronic scale comprising a planar first surface; a planar second surface opposite the first surface having a depression formed therein defining a flexure area; a load cavity formed in the second surface having a conical receptacle end for receiving a strut; and sensor means disposed over the flexure area for generating a signal is response to a load applied to the loading cavity wherein the strut has a first projection end coupled to the conical end of the loading cavity and a second end coupled to a footer member such that the strut mechanically floats therebetween for providing the applied load at a substantially central position at the load cavity.

BRIEF DESCRIPTION OF THE DRAWINGS

For a detailed understanding of the present invention, reference should be made to the following drawings wherein.

DETAILED DESCRIPTION OF THE INVENTION

Figure 1A:
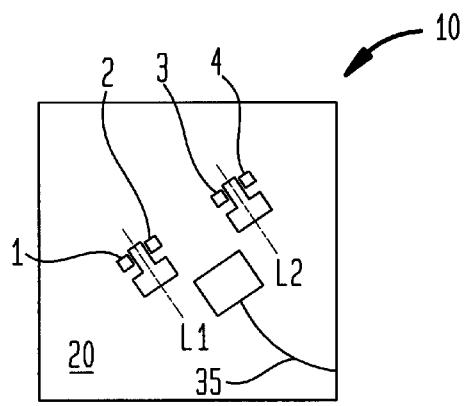
FIG. 1A is a top plan view of an embodiment of the bossed diaphragm sensor plate of the present invention.
Figure 1B:
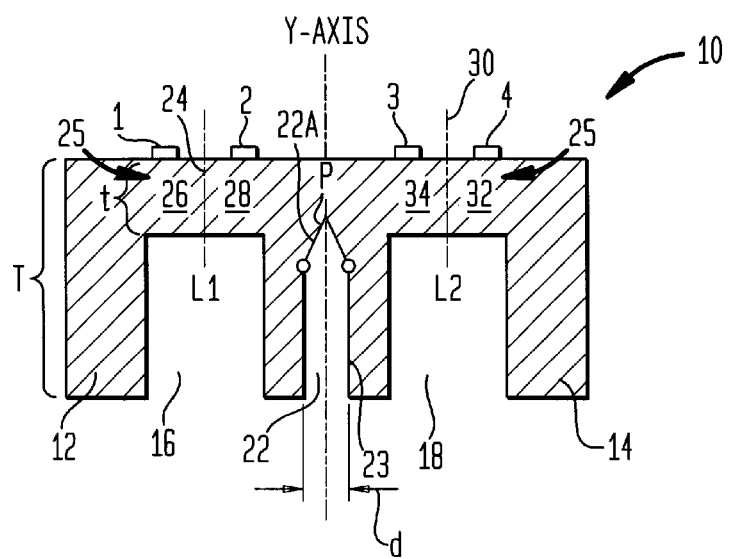
FIG. 1B is a cross-sectional view of the sensor plate shown in FIG. 1A.

Referring collectively to FIGS. 1A and 1B, a load cell sensor plate 10 according to an embodiment of the present invention is shown. Generally, the sensor plate 10 is fabricated from sheet metal in a substantially flat rectangular configuration, which allows the sensor plate to be used in low profile load cell designs. The unitary design of the sensor plate 10 provides substantially reliable performance and enables the sensor plate to be simply and economically manufactured.

Figure 3:
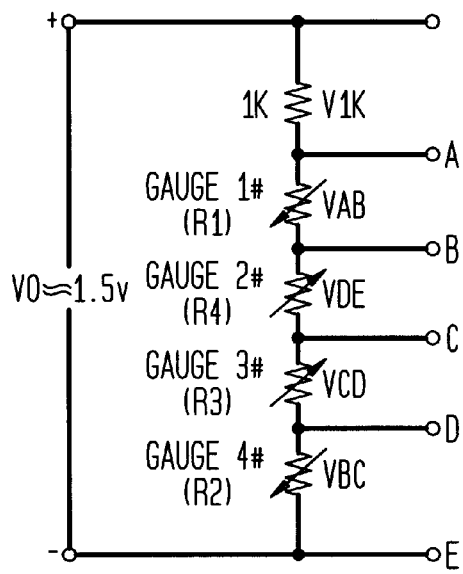
FIG. 3 is a schematic circuit diagram which depicts how the strain gauges of the sensor plate are coupled.
Figure 5:
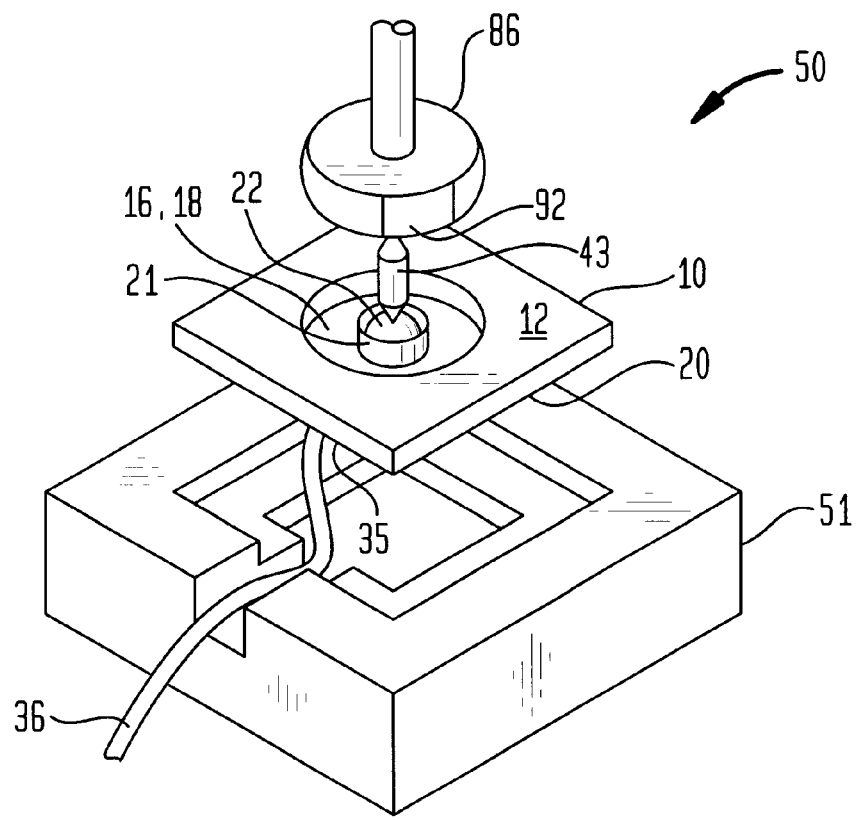
FIG. 5 is a perspective view of a load cell comprising sensor plate, reinforcement member and strut according to the present invention.
Figure 6:
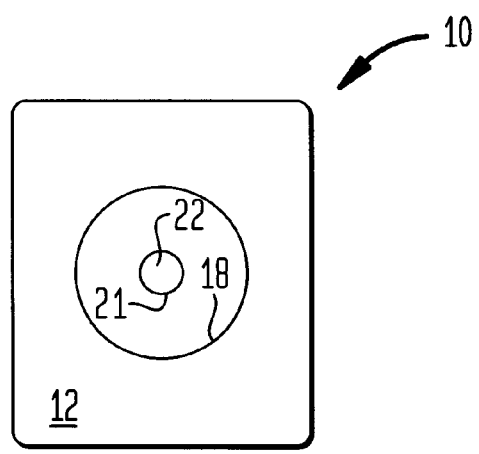
FIG. 6 is a plan view of a second surface associated with the sensor plate having an annular depression and conical cavity formed therein according to the present invention.
Figure 8:
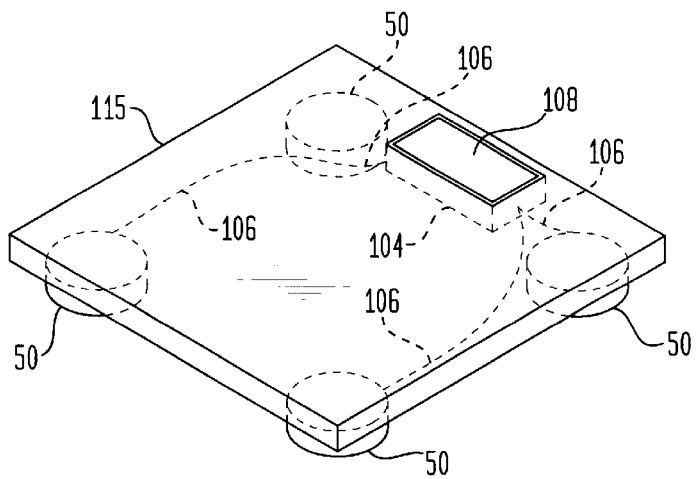
FIG. 8 is a perspective view of an electrical weighing scale employing load cells equipped with the bossed diaphragm sensor plate according to the present invention.

FIG. 1A shows a first planar surface 20, a bossed sensor plate 10 on which is disposed sensor means comprising strain gauges 1–4 interconnected in a circuit configuration as identified in FIG. 3. As one can ascertain, surface 20 is substantially planar and includes bonding pads 30 and 40 disposed respectively between strain gauges 1, 2, and 3, 4. The flat planar surface 20 facilitates electrical interconnection between the sensors formed on the surface 20 and the remainder of the electronic circuitry housed within the electrical weighing scale via circuit 35 and electronic connector 36 as shown in FIGS. 5 and 8. The sensors are disposed over a thinned surface area of the bossed sensor plate defined as a flexure area in order to sense bending moments resulting from an applied load or force.

Figure 9A:
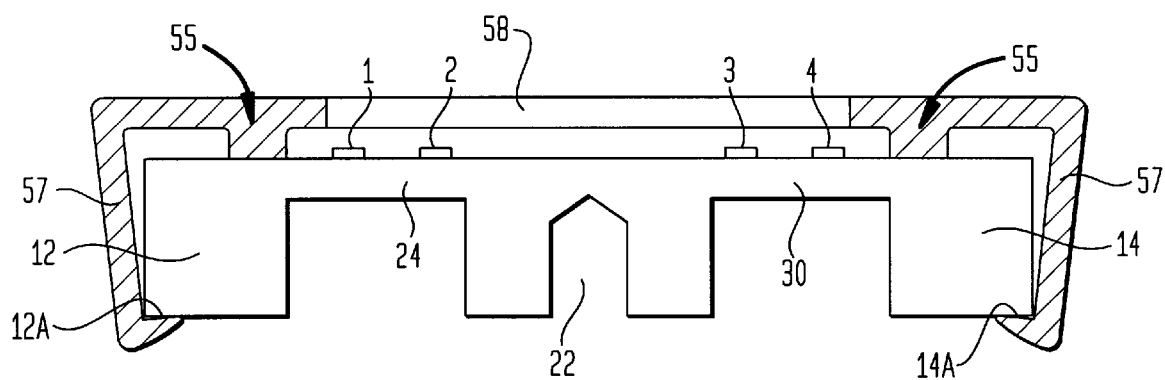
FIG. 9A–B represent a partial cross sectional view and a top view respectively of the bossed diaphragm sensor plate and backing plate assembly according to the embodiment illustrated in FIG. 2B.
Figure 9B:
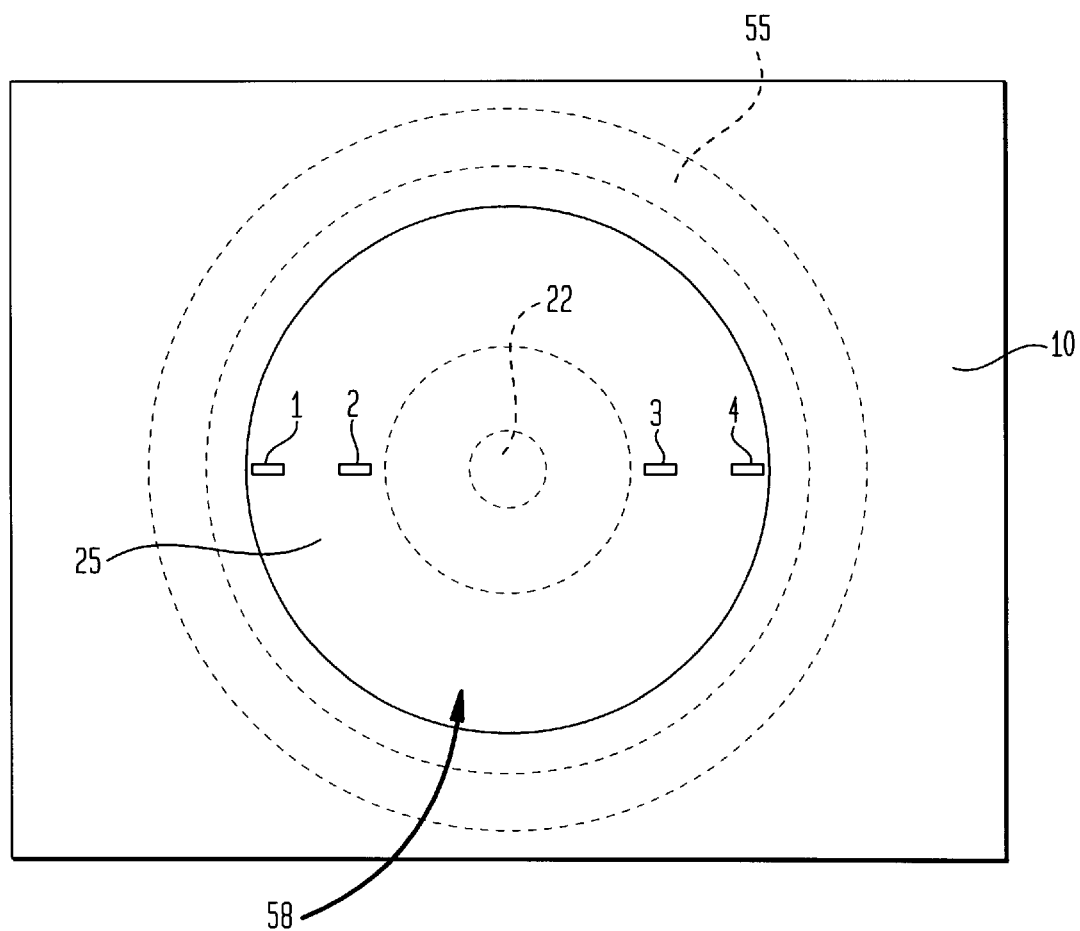

Referring now to FIG. 1B, the sensor plate 10 comprises a boss diaphragm structure having a flexure area which, in the preferred embodiment, is substantially annular and is illustrated in FIG. 1B by first and second flexure portions 24 and 30 defined in the sensor plate. The flexure portions or beams are defined in the sensor plate between apertures or slots 16, 18. Mounting sections 12 and 14 enable the sensor plate 10 to either rest or be anchored within the interior of a load cell as illustrated in FIG. 2B (reference numerals 12A, 14A). In a preferred embodiment the flexure area 25 has a uniform thickness t less than the overall thickness T of the sensor plate. Preferably flexure area is between 5 and 8 times less than the overall thickness T of the sensor plate thus allowing for appropriate flexing and sensing of the force applied to the load cell. Note further that the sensor pairs are preferably placed directly opposite one another as illustrated in FIG. 1A and FIG. 9B to provide an equalized sensing of the applied force impacting the load cell.

As shown in FIG. 1B, sensor plate 10 further includes cavity 22 for receiving a conical shaped projection for concentrating an applied load to the load cell. Cavity 22 comprises substantially circular side walls 23 terminating in a conical shaped end portion 22A. Cavity 22 has a diameter d of sufficient size to receive a strut 43 (see FIGS. 2A–B) having a conical shaped projection 44 which engages the cavity at substantially the point p at the center of the cone along the designated Y-axis. The conical projection 44 from strut 43 inserted into cavity 22 functions to concentrate an applied load to the boss diaphragm structure plate 10 which generates a bending moment applied to the flexure portions 24 and 30.

Figure 1C:
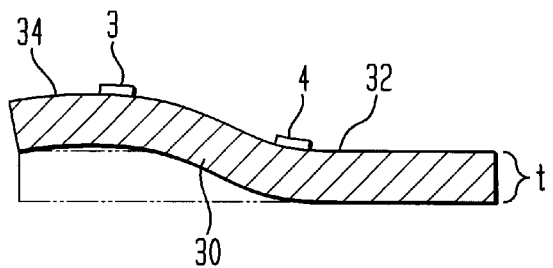
FIG. 1C is a cross sectional view of the sensor plate showing tension and compression sections associated with the flexure area.

Referring to FIG. 1B, the first flexure portion 24 includes a compression section 26 and a tension section 28. The line of demarcation between the compression and tension section 26, 28 is shown by dotted line L1. Similarly, second flexure beam 30 includes compression section 32 and tension section 34, which are shown separated by dotted line L2. The first flexure portion 24 includes the strain gauge 1 bonded to the surface of its compression section 26 and the strain gauge 2 bonded to the surface of the tension section 28. Similarly, second flexure portion 30 includes strain gauge 3 bonded to the surface of its compression section 32 and strain gauge 4 bonded to the surface of its tension section 34. The strain gauges preferably consist of piezo-resistor sensing elements. FIG. 1C illustrates the operation of the tension and compression sections of flexure 30 in response to a load.

FIG. 3 shows the electrical interconnection of the strain gauges 1–4 for equalizing the forces sensed by the strain gauges. Cross coupling is accomplished by electrically coupling the strain gauges of the first flexure beam in series with those of the second flexure beam to form the bridge structure 36 depicted in FIG. 3. This circuit structure will supply an output signal which will very accurately characterize the total load applied to cavity 22 of the sensor plate 10. It should be understood that the sensor plate of the present invention is not limited to the strain gauge arrangement described above. Accordingly, other well known sensor arrangements may be employed in the bossed diaphragm sensor plate of the present invention if desired.

Figure 2A:
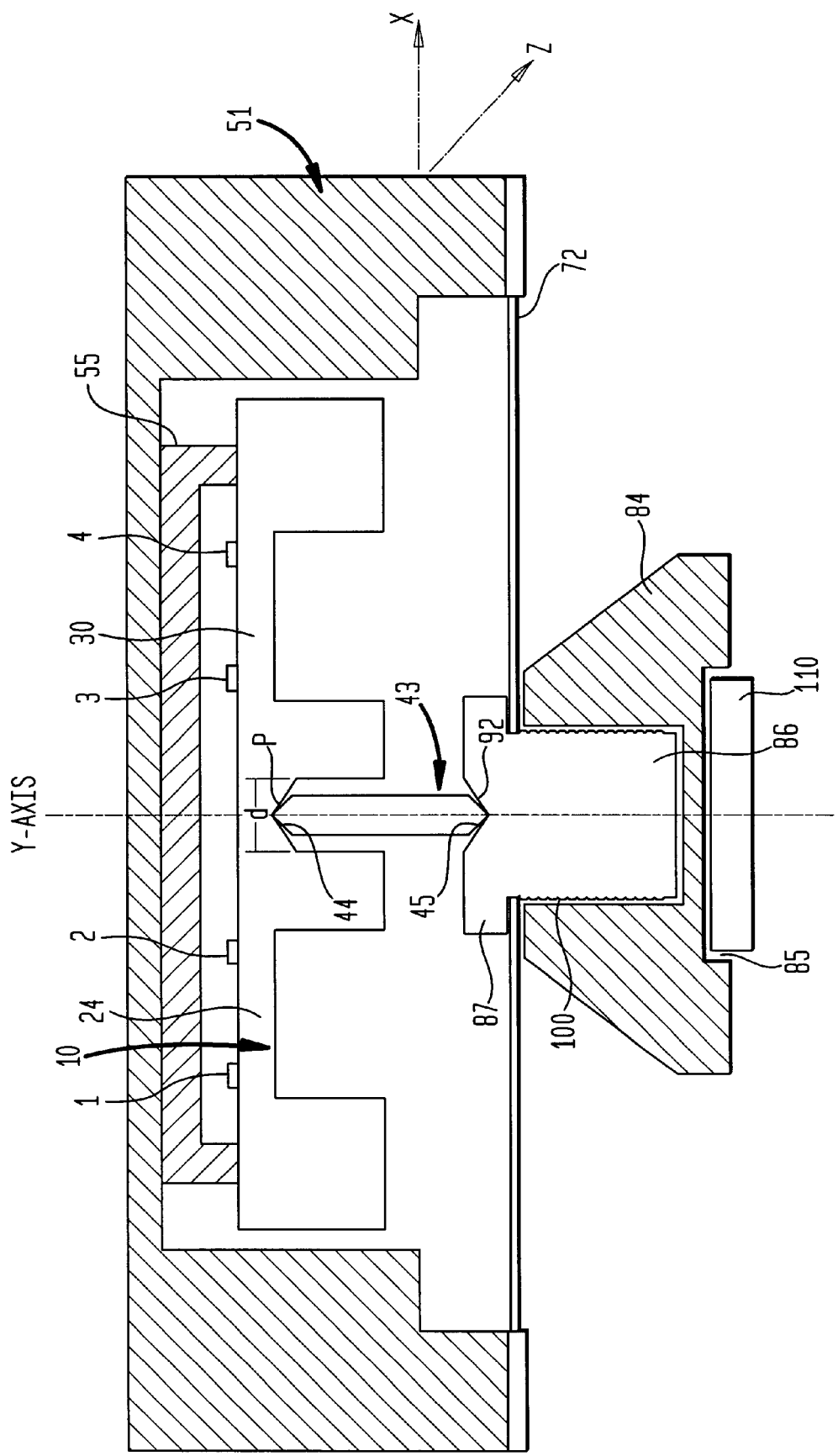
FIG. 2A represents a partial cross-section associated with one side of the bossed diaphragm load cell having a floating conical strut according to an embodiment of the present invention.
Figure 2B:
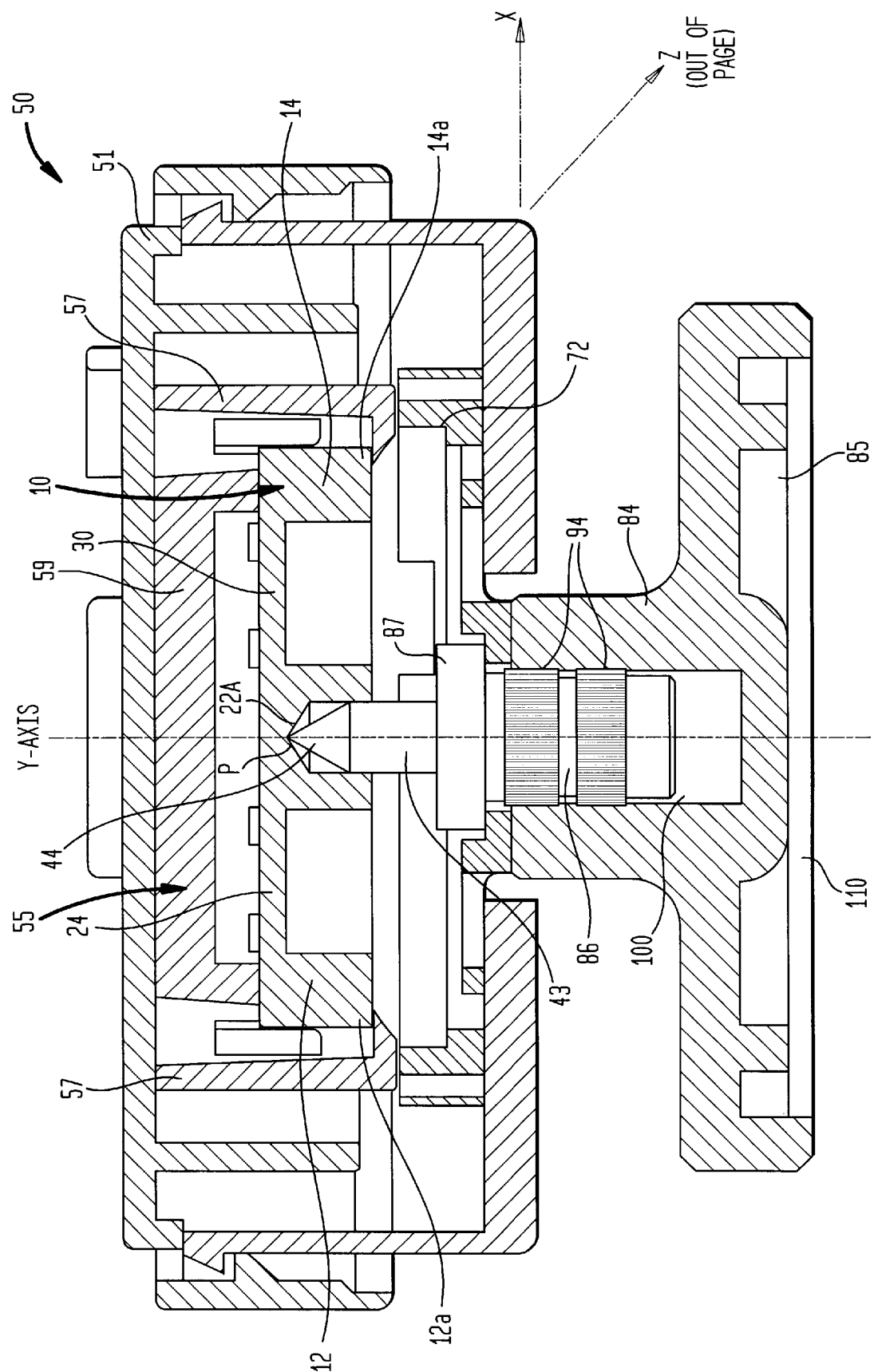
FIG. 2B represents a partial cross-section associated with one side of the bossed diaphragm load cell having a fixed conical strut according to an alternative embodiment of the present invention.

FIG. 2A depicts a cross-sectional view of a boss diaphragm sensor plate 10 of the present invention as it is used in the low profile load cell designated by numeral 50. A load cell 50 comprises a housing 51 which contains the boss diaphragm sensor plate 10, and a spiral positioner biasing element 72. As shown in FIG. 2A, a strut member 43 having a substantially circular cross section and oppositely disposed conical shaped ends 44 and 45 operates to apply a load to the bossed sensor plate 10. Conical projection 45 of strut 43 engages reinforcement member 86 having a substantially flanged portion 87 which rests upon element 72. Conical grooved portion 92 of reinforcement member 86 is adapted to receive conical end 45 in such a manner as to allow strut 43 to mechanically "float" between member 86 and sensor plate 10. That is, for any twist or rotation resulting from a force applied resulting from an off axis force applied to the load cell, floating strut 43 operates to direct the load to center point p along the y-axis so that the load cell is self correcting, and thus operates to evenly distribute the applied force. Absent such a floating structure, off-center loading would result in off-axis forces detected by the sensor arrangement and factored into the weighing calculation resulting in erroneous or inaccurate weight readings. Thus, the load cell arrangement comprising the boss diaphragm sensor plate 10, strut 43, and reinforcement member 86 combine to self-correct for any off-center loading that may occur as a result of twisting, rotation, or uneven surfaces associated with the angular position of the foot rest for each load cell. Moreover, the boss diaphragm design allows for low cost manufacture of the load cell by requiring only a milling operation to be performed in order to generate a load cavity and associated flexure area. Finally, the planar design facilitates electrical interconnection on the top surface of the load cell to achieve a low cost and highly accurate product. As one can ascertain from FIG. 2A, strain gauges 1 and 2 are disposed over flexure portion 24 of the overall flexure area 25 while sensors 3 and 4 are disposed flexure portion 30 for sensing tension and/or compression resulting from the applied load. Backing plate 55, as will be discussed in greater detail with regard to FIG. 2B.

In an alternative embodiment shown in FIG. 2B the load cell 50 includes strut 43 fixedly positioned within member 86 at one end and conically engaging lower cavity 22 via projection 44. Note that when referring to the drawings, and in particular to FIGS. 2A and 2B, like parts are indicated by like reference numerals. The embodiment shown in FIG. 2B further includes flexible backing plate 55 having arm portions 57 which support and engage bossed diaphragm sensor plate 10 that mounting sections 12 and 14 (and at 12A and 14A).

In a fixed strut embodiment, as the foot 84 may tend to angle off-axis, the subassembly comprised of the boss diaphragm sensor plate 10 and the backing plate 55 operate to move laterally, thereby maintaining the point 44 of strut 43 in the center of the conical depression 22A in plate 10. This feature provides a more secure assembly with less risk of displacing any parts and provides for increased stability without loss of accuracy. FIGS. 9A and B illustrate more detailed cross-sectional and top views respectively of the embodiment shown in FIG. 2B including the bossed diaphragm sensor plate 10 and backing plate 55. As clearly illustrated in FIGS. 9A and B, hole 58 is provided in backing plate 55 to allow for electronic wires or interconnections between the sensors of the load cell for communication with other load cells and with the remainder of the weighing scale. The backing plate is disposed in a circular configuration over the mounting sections 12 and 14 (element 59) so as not to impact on the flexure area 25. The backing plate is preferably made of a lightweight material such as a plastic having a circular top configuration 59 and having square-like arms 57 which enable the backing plate to fit snugly around the metal bossed diaphragm. As shown in FIGS. 2B and 9A, the backing plate disposed on the bossed diaphragm within housing 51 is fixed in the Y-axis for direction but maintains degrees of freedom within the X and Z (out of the page) planes to permit lateral movement in order to maintain the strut in substantially the center of the bossed diaphragm.

Figure 4:
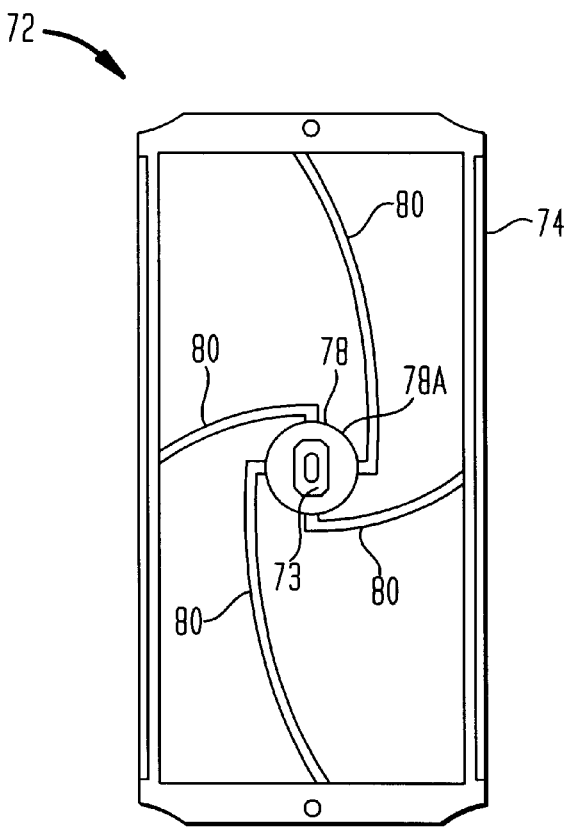
FIG. 4 is a view of the biasing element shown in FIG. 2.

In the embodiments of FIGS. 2A, 2B reinforcement member 86 comprises a hardened steel insert. The hardened steel reinforcement member 86 is disposed within an aperture 100 of foot cell 84 extends out from the top of foot 84. Gripping surfaces 94 engage the inner walls of load cell 84 to prevent inadvertent removal of member 86. Biasing element 72 as shown in FIGS. 2A and 2B, has a rectangular shaped outer frame 74 having width and length dimensions substantially similar to sensor plate 10 width and length dimensions, includes an annular member 78 which is coupled to the frame 74 by a plurality of resilient, spiral-shaped arm members 80. Biasing element 72 also ensures that conically grooved surface 92 (FIG. 2A) of reinforcement member 86 is engaged with projection 45 on strut 43. The flanged portion 87 of member 86 fits within annular member 78 of spiral bias element 72, resting on lip 73 (see FIG. 4) such that a top surface of member 86 is planar with annular surface 78A. Pad 110 fits within the cavity 85 of foot member 84 in order to provide a solid and stable base.

As one can ascertain, operation of the load cell is as follows. A load is applied to the load cell 50 via the foot 84 which engages reinforcement member 86 causing projection 44 on strut 43 to be applied to portion 22A of cavity 22 resulting in deflection which causes the flexure beams 24, 30 of the sensor plate to bend. The bending forces are sensed by the strain gauges 1, 2, 3, and 4 which generate an electrical signal that is indicative of the load applied to cavity 22 of the boss diaphragm sensor plate 10. The boss diaphragm plate 10 of the present invention allows the load cell 50 to be constructed with a very low profile, since the present invention sensor plate provides both load support and load measurement in a single planar member which enables the load cell 50 to be employed in many different applications involving the measurement of weight. Note that the load cell may also be provided with a conventional power switch means (not shown) of well-known types capable of powering up or powering down an electronic weighing scale.

Figure 7:
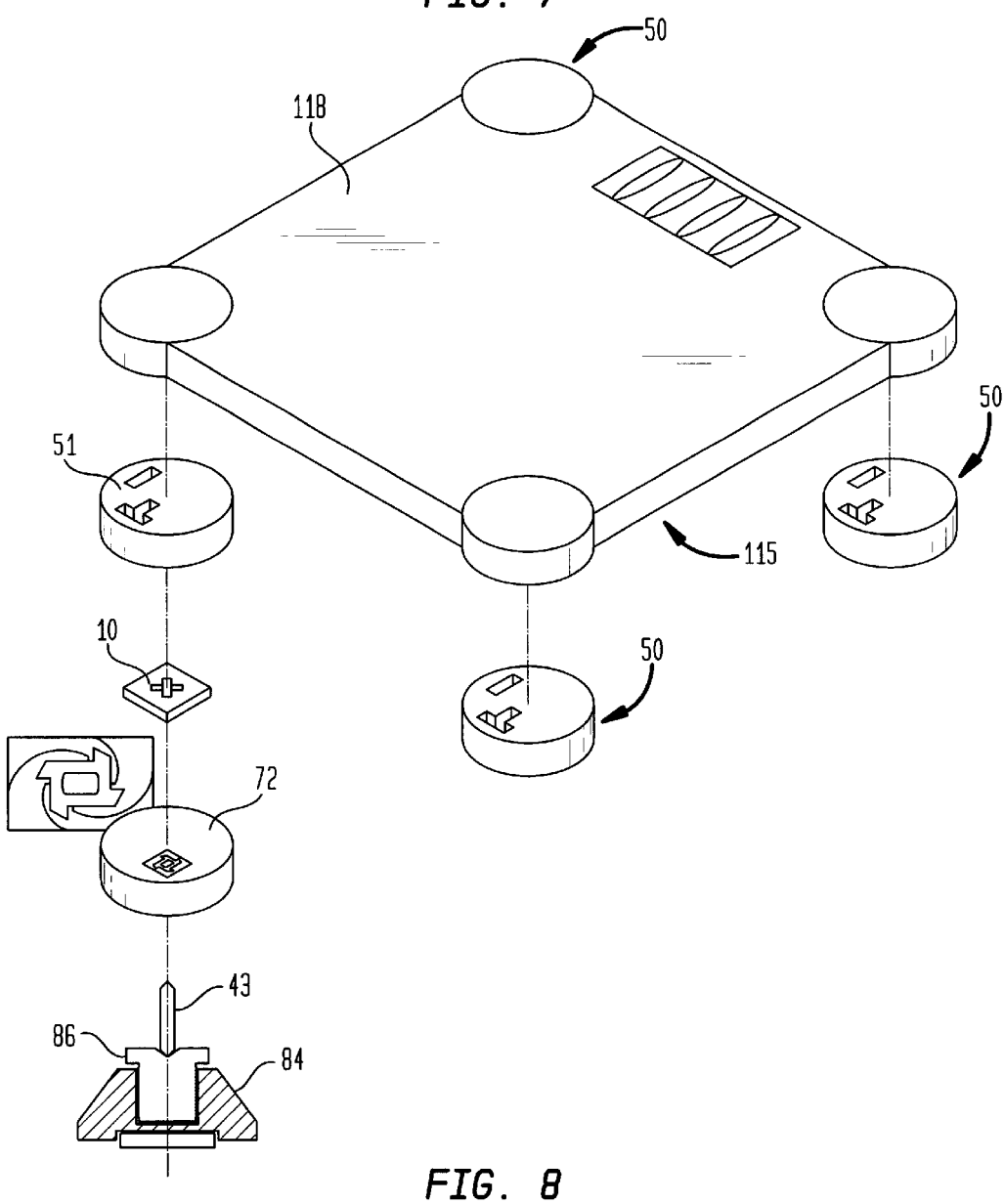
FIG. 7 is a perspective view illustrating each of the major elements used in assembling the load cell according to the present invention for use in an electronic weighing scale.

Referring now to FIG. 5, there is shown a perspective view of a load cell 50 comprising the boss diaphragm sensor plate 10, strut 43, and reinforcement member 86. As shown in FIG. 5, sensor plate 10 is substantially square with a substantially planar first surface 20 and second surface 12 opposite first surface 20 on which is formed an annular depression 18 which defines a flexure area on which are disposed sensor means comprising strain gauges 1, 2, and 3, 4 such that the flexure beams 24 and 30 are formed as illustrated in FIG. 1B. Circular cavity 22 is formed in substantially the center of the plate such that a substantially cylindrical projection 21 having cavity 22 disposed therein, is formed. The projection is coplanar with the remaining flat portion of surface 12 as illustrated in FIG. 5. Cavity 22 as previously mentioned, included conical shaped end 22A (FIGS. 1B, 2A–B) for receiving similarly shaped strut 43 floatingly disposed therein. The other end of strut 43 floatingly engages conical shaped cavity 92 of reinforcement member 86 which is retained in foot cell member 84 and which engages spiral bias member 72 (not shown). Alternatively, as previously stated, the other end of strut 43 may fixedly engage foot 84 via reinforcement member 86 such that the strut remains in a fixed location at one end. Still further, a backplate (not shown) is adapted to snuggly fit around the outer surface and mounting portions of sensor plate 10 and operative to move laterally in consonance with the bossed diaphragm sensor plate for maintaining engagement of the conical strut at a substantially center position within the plate in response to off-axis forces. The first surface 20 of plate member 10 is protected by housing 51 which serves also to secure the device within the scale. FIG. 7 is a perspective view of each of the major elements for assembling the load cell of the present invention for use in a transparent weighing scale 115 having a glass platform 118.

In FIG. 8 there is shown an electronic weighing scale 115 which employs the load cell 50 of the present invention. Generally, the scale 100 comprises a platform 102 supported in each corner by a load cell 50 constructed as described earlier. The scale 100 also includes a display assembly 104 which is electrically coupled to the sensing arrangement of each sensor plate contained in the load cells 50 via wiring 106. The load cells may or may not include the power switch means discussed previously.

When a load is placed on the platform 102, the load is distributed among the four load cells 50, such that each strain sensing arrangement of each load cell's sensor plate 10 generates an electrical signal which is proportional to the load on the load cell 50. The four signals generated by the load cells 50 are transmitted by the wiring 106 to the display assembly 104 which has electrical circuitry that combines the four signals into a single analog signal which is proportional to the sum of the loads on the four individual lead cells 50. The display assembly 104 also includes an amplifier (not shown) that amplifies the combined analog signal, and an analog-to-digital converter (not shown) which translates the analog signal to a digital signal. Additional well known circuitry in the display assembly 104 transforms the digital signal into a reading in pounds or the like which is digitally displayed on the display screen 108 of the display assembly 104. The electrical circuitry contained in the display assembly 104 is well known in the art and an example of such circuitry can be found in the copending U.S. patent application Ser. No. 08/385,349, incorporated herein by reference.

It should be understood that the embodiment described herein is merely exemplary and that a person skilled in the art may make many variations and modifications to the embodiment utilizing functionally equivalent elements to those described herein. For instance, while there has been shown a substantially rectangular or square shaped plate member 10, a plate member having a circular or even triangular perimeter or any other geometric configuration may also be provided. Similarly, while an annular depression has been illustrated over which the flexure members and sensors are disposed, other geometric configurations are also contemplated, including substantially rectangular channel-like sections, as well as any other geometric shape which allows for the flexure of particular portions of the sensor plate. In addition use of the backing plate 55 illustrated in FIG. 2B may also be contemplated as part of the dual-coned floating strut depicted in the embodiment of FIG. 2A. Moreover, while in the preferred embodiment the thickness t of a flexure member is between 5 and 8 times less than the overall thickness T of the plate, other relative dimensions may also be utilized according to particular applications and requirements. Any and all such variations or modifications, as well as others which may become apparent to those skilled in the art, are intended to be included within the scope of the invention as defined by the appended claims.

What is claimed is:

1. A sensor plate for use in a load cell for an electronic scale comprising:
   a planar first surface;
   a planar second surface opposite said first surface having a depression formed therein defining a flexure area;
   a load cavity formed in said second surface having a conical end for receiving a floating strut;
   sensor means disposed over said flexure area for generating a signal in response to a load applied to said load cavity via said floating strut, wherein said floating strut has a first projection coupled to said conical end of said load cavity and a second projection end coupled to a footer member such that said strut mechanically floats therebetween for providing said applied load at a substantially central position of said load cavity.

2. The sensor plate according to claim 1, wherein said flexure area defines first and second flexure portions on which is disposed said sensor means.

3. The sensor plate according to claim 2, wherein said load cavity is positioned at substantially a center position of said sensor plate.

4. The sensor plate according to claim 3, wherein said sensor means is disposed on both of said flexure portions.

5. The sensor plate according to claim 4, wherein said sensor means includes a pair of strain gauges disposed on each of said first and second flexure portions, said strain gauges on first flexure portion is cross coupled to said strain gauges on said second flexure portion to equalize forces sent by said strain gauges in response to an applied load.

6. The sensor plate according to claim 1, said strut having first and second oppositely disposed conical projections engaging said load cavity conical end and said footer member operative to concentrate an applied load into said load cavity at a central position.

7. The sensor plate according to claim 2, wherein said flexure portions includes first and second strain gauges disposed thereon and wherein deflections of said load cavity generate bending moments in said flexure beams which places said first strain gauge into tension and said second strain gauge into compression.

8. The sensor plate according to claim 1, wherein said flexure area has a thickness of between 5 and 8 times less than a thickness associated with said sensor plate.

9. A load cell for use in an electronic weighing scale comprising:
   a sensor plate having a flexure area and a loading cavity, said loading cavity having a conical end portion for receiving a strut, said strut having a first conical projection engaging said loading cavity and a second conical projection engaging an indentation within a footer member for receiving an applied load, wherein said strut is floatingly coupled between said sensor plate and said footer member for transferring said applied load to said loading cavity at a substantially central point;
   at least one element being at least partially secured adjacently to at least a portion of said sensor plate so as to at least partially secure said sensor element against said applied load; and
   sensor means disposed on said flexure area for generating an electrical signal in response to said transferred load applied to said loading cavity of said sensor plate, wherein said flexure area flexes in response to said applied load and said electrical signal is indicative of said applied load.

10. The load cell according to claim 9, wherein said sensor plate is substantially rectangular in shape.

11. The load cell according to claim 9, wherein said sensor means includes a pair of strain gauges disposed on a portion of said flexure area.

12. The load cell according to claim 11, wherein said strain gauges on a first portion of said flexure area are cross coupled with said strain gauges on a second portion of said flexure area to equalize forces sensed by said strain gauges in response to an applied load.

13. The load cell according to claim 12, wherein deflection of said load cavity by said strut generates bending moments in said flexure area which places said first strain gauge in contention and said second strain gauge into compression.

14. The load cell according to claim 13, wherein said sensor plate is sandwiched between a housing and said floating strut.

15. The load cell according to claim 14, wherein said footer member is positioned within a spiral bias member.

16. An electronic scale for displaying the weight of a load applied to said scale comprising:
   a platform;
   a plurality of load cells attached to said platform for elevating said platform above a supporting surface, each of said load cells supporting a portion of a load and including a bossed diaphragm sensor plate having a loading cavity, a flexure area and sensor means disposed on said flexure area for generating an electrical signal is response to a load applied to said loading cavity of said sensor plate, said electrical signal being indicative of an applied load, wherein said load applied to said loading cavity occurs via a strut having a conical projection engaging a corresponding conical receptacle in said loading cavity, said strut having a second conical projection engaging a similarly shaped receptacle in a footer member such that said strut is floatingly retained between said footer member and said sensor plate; and
   display means for receiving said electrical signals generated by said sensor plate in each of said load cells and displaying the weight of the load.

17. The electronic scale according to claim 16, wherein said sensor means include a pair of strain gauges disposed on first and second portions of said flexure area, said strain gauges on said first flexure area portion cross coupled with said strain gauges on said second flexure area portion to equalize forces sensed by said strain gauges in response to an applied load.

18. The electronic scale according to claim 15, wherein said sensor means include a first and second strain gauges wherein deflection of said loading cavity generates bending moments in said flexure area, which places said first strain gauge into contention and said second strain gauge into compression.

19. The electronic scale according to claim 18, wherein said sensor plate comprises a first planar surface on which is disposed said sensor means and a second surface opposite said first surface having a depression formed therein defining said flexure area.

20. The electronic scale according to claim 19, wherein said first planar surface includes a bonding pad and electrical interconnections for electrically communicating with other said load cells.

* * * * *